US008760695B2

United States Patent
Yamato

(10) Patent No.: US 8,760,695 B2
(45) Date of Patent: Jun. 24, 2014

(54) IMAGE PROCESSING APPARATUS, IMAGE PROCESSING METHOD, AND COMPUTER READABLE MEDIUM

(75) Inventor: Kazumi Yamato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 311 days.

(21) Appl. No.: 13/252,864

(22) Filed: Oct. 4, 2011

(65) Prior Publication Data

US 2012/0200881 A1 Aug. 9, 2012

(30) Foreign Application Priority Data

Feb. 7, 2011 (JP) ................. 2011-023920

(51) Int. Cl.
*G06F 3/12* (2006.01)
*G06F 17/00* (2006.01)

(52) U.S. Cl.
USPC ........................................ 358/1.15; 705/408

(58) Field of Classification Search
USPC ........... 358/448, 404, 444, 1.15, 1.6, 1.9, 2.1; 405/408
See application file for complete search history.

(56) References Cited

U.S. PATENT DOCUMENTS

| 5,182,798 | A  | * | 1/1993 | Francisco .................... 709/251 |
| 6,179,288 | B1 | * | 1/2001 | Bezelga et al. .............. 271/225 |
| 2002/0073052 | A1 | * | 6/2002 | Katikaneni et al. .......... 705/408 |
| 2004/0118089 | A1 | * | 6/2004 | Riccardi ........................ 53/492 |
| 2007/0127090 | A1 | * | 6/2007 | Nonaka .......................... 358/498 |
| 2010/0152009 | A1 | * | 6/2010 | Edel ............................. 493/210 |
| 2011/0154778 | A1 | * | 6/2011 | Oshio et al. ..................... 53/64 |
| 2011/0220557 | A1 | * | 9/2011 | Sasaki et al. ................. 209/645 |
| 2013/0174515 | A1 | * | 7/2013 | Wakatabi et al. ........... 53/284.3 |

FOREIGN PATENT DOCUMENTS

| JP | 08258816 | * 10/1996 | ............ G03G 15/00 |
| JP | 2003-146450 A | 5/2003 | |
| JP | 2005-056001 A | 3/2005 | |
| JP | 2009-301363 A | 12/2009 | |

* cited by examiner

*Primary Examiner* — Jerome Grant, II
(74) *Attorney, Agent, or Firm* — Sughrue Mion, PLLC

(57) ABSTRACT

An image processing apparatus includes a receiving unit that receives print control information input by a user, a unit that stores, in a memory, the print control information received by the receiving unit, and a print controller that causes a printing unit to print an image representing an image to be printed on a sheet to be imaged on the basis of the print control information stored in the memory when a predetermined operation is performed. The print control information includes first information indicating whether the sheet to be imaged is an envelope and second information indicating the size of the sheet to be imaged.

8 Claims, 5 Drawing Sheets

| NAME OF SHEET | TYPE DATA | SIZE DATA (LONG SIDE × SHORT SIDE) | CONDITION DATA | POSITION DATA |
|---|---|---|---|---|
| A4 | PLAIN PAPER | 297 mm × 210 mm | null | null |
| B5 | PLAIN PAPER | 257 mm × 182 mm | null | null |
| STANDARD SIZED ENVELOPE | ENVELOPE | 205 mm × 90 mm | null | null |

FIG. 3

NAME OF SHEET
| USER-DEFINED ENVELOPE | ~ 6a

LONG SIDE  6b
| X | MILLIMETER

SHORT SIDE  6c
| Y | MILLIMETER

ENVELOPE SIZE
[✓]~ 6d

FLAP POSITION
[✓] SHORT SIDE
     ~ 6e
[ ] LONG SIDE
     ~ 6f

FLAP CONDITION
[✓] OPEN
     ~ 6g
[ ] CLOSED
     ~ 6h

FIG. 4

| NAME OF SHEET | TYPE DATA | SIZE DATA (LONG SIDE × SHORT SIDE) | CONDITION DATA | POSITION DATA |
|---|---|---|---|---|
| A4 | PLAIN PAPER | 297 mm × 210 mm | null | null |
| B5 | PLAIN PAPER | 257 mm × 182 mm | null | null |
| STANDARD SIZED ENVELOPE | ENVELOPE | 205 mm × 90 mm | null | null |
| USER-DEFINED ENVELOPE | ENVELOPE | X mm × Y mm | OPEN CONDITION | SHORT SIDE |

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-023920 filed Feb. 7, 2011.

BACKGROUND (i) Technical Field

The present invention relates to an image processing apparatus, an image processing method, and a computer readable medium.

SUMMARY

According to an aspect of the invention, there is provided an image processing apparatus including a receiving unit that receives print control information input by a user, a unit that stores, in a memory, the print control information received by the receiving unit, and a print controller that causes a printing unit to print an image representing an image to be printed on a sheet to be imaged on the basis of the print control information stored in the memory when a predetermined operation is performed. The print control information includes first information indicating whether the sheet to be imaged is an envelope and second information indicating the size of the sheet to be imaged.

BRIEF DESCRIPTION OF THE DRAWINGS

Exemplary embodiments of the present invention will be described in detail based on the following figures, wherein:

FIG. 3 illustrates an example of a sheet registration user interface;

FIG. 4 illustrates an exemplary table;

DETAILED DESCRIPTION

Exemplary embodiments of the invention are described in detail below with reference to the accompanying drawings.

Image Processing System

Figures 1, 2:
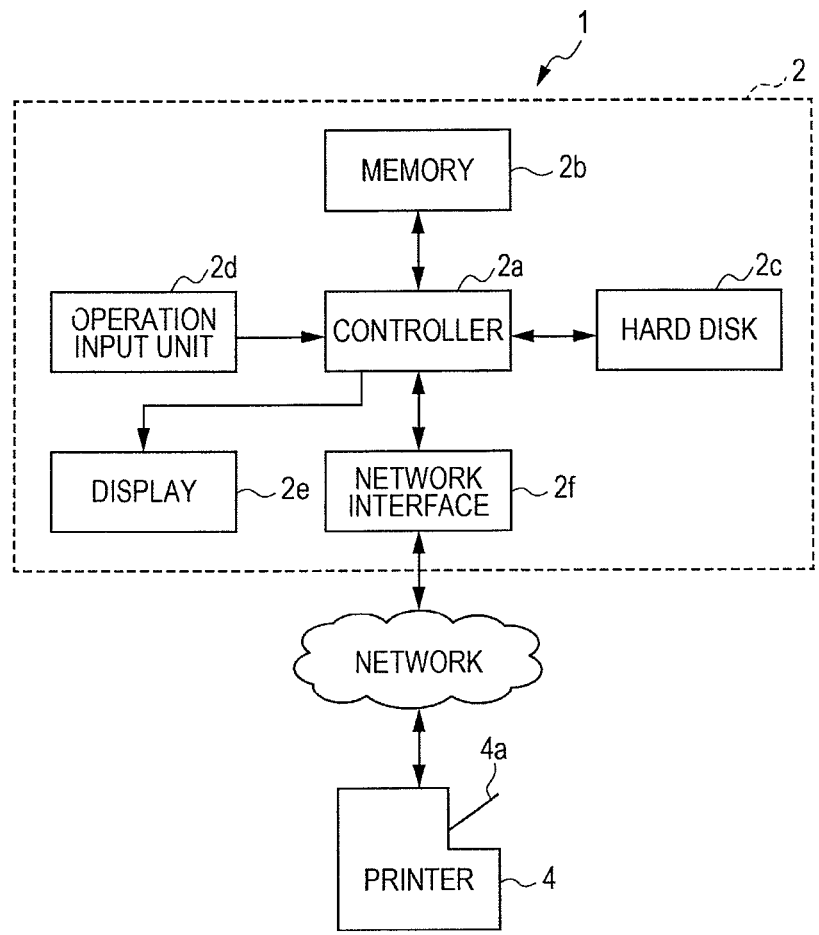
FIG. 1 illustrates an exemplary configuration of a printing system.
FIG. 2 illustrates an exemplary table.

FIG. 1 illustrates an exemplary configuration of a printing system 1. The printing system 1 includes an image processing apparatus 2 of a user and a printer 4. The image processing apparatus 2 is connected to the printer 4 via a network. Thus, the image processing apparatus 2 and the printer 4 can communicate with each other.

Image Processing Apparatus

The image processing apparatus 2 is formed from, for example, a personal computer. The image processing apparatus 2 includes a controller 2a, a memory 2b, a hard disk 2c, an operation input unit 2d, a display 2e, and a network interface 2f (hereinafter simply referred to as a "network IF 2f").

The controller 2a is formed from, for example, a microprocessor. The controller 2a performs information processing in accordance with a program stored in the memory 2b. Hereinafter, the program stored in the memory 2b is referred to as a "printer driver".

The memory 2b includes a random access memory (RAM) and a read only memory (ROM). The memory 2b stores the printer driver and a variety of data items required during information processing. Note that the printer driver may be read out of a computer-readable information storage medium, such as a DVD®-ROM, and may be stored in the memory 2b. Alternatively, the printer driver may be supplied via communication lines, such as a network, and may be stored in the memory 2b.

The hard disk 2c serves as a storage medium that stores a variety of information items. The hard disk 2c stores plural images to be printed. Among information items stored in the hard disk 2c, information items other than images are described below.

The operation input unit 2d is formed from, for example, a mouse and a keyboard. The operation input unit 2d outputs, to the controller 2a, information regarding the operation performed by a user. In addition, the display 2e is formed from a liquid crystal display. The display 2e displays the information input from the controller 2a.

The network IF 2f transmits information to the network and receives information from the network. For example, a network interface card is used as the network IF 2f. The network IF 2f receives information from the network and outputs the received information to the controller 2a.

In addition, the network IF 2f outputs information input from the controller 2a to the network. According to the present exemplary embodiment, the network IF 2f transmits print job data based on an image to be printed to the printer 4 via the network.

Printer

The printer 4 (a printing unit) is formed from, for example, a laser printer. The printer 4 includes a paper tray 4a (a setting member) that sets sheets to be imaged. The printer 4 prints an image representing an image to be printed on a sheet set in the paper tray 4a on the basis of print job data received from the image processing apparatus 2.

More specifically, if the printer 4 receives print job data, a sheet set in the paper tray 4a is transported to a transfer drum, and toner deposited on the transfer drum is transferred onto the sheet. Thereafter, in order to fix the toner onto the sheet, heat and pressure are applied to the sheet by a fixing roller. Subsequently, the sheet is output onto an output tray (not illustrated). Note that the pressure applied by the fixing roller is controlled on the basis of the print job data. As a result, the pressure is applied in accordance with the quality of the sheet.

Table

FIG. 2 illustrates an exemplary table stored in the hard disk 2c (a storage unit) at the same time as the printer driver is installed. The table contains the name of a sheet registered as a candidate of a sheet to be imaged (hereinafter referred to as a "registered sheet") in association with print control information used for controlling printing of an image onto the registered sheet by the printer 4. As illustrated in FIG. 2, the print control information includes type data (a first information item), size data (a second information item), condition data (a third information item), and position data (a fourth information item).

The type data indicates the type of registered sheet. That is, the type data indicates whether the registered sheet is an envelope or not. For example, the type data included in the print control information used for controlling printing of an image on an A4 sheet indicates that the A4 sheet is a plain paper sheet. That is, this type data indicates that the A4 sheet is not an envelope. In addition, for example, the type data included in the print control information used for controlling printing of an image on a B5 sheet indicates that the B5 sheet is a plain paper sheet. That is, the type data indicates that the B5 sheet is not an envelope. Furthermore, the type data included in the print control information used for controlling printing an image on a standard sized envelope indicates that the standard sized envelope is an envelope.

As used herein, the term "standard sized envelope" refers to a commercially available envelope having a size specified in a standard. According to the present exemplary embodiment, a standard sized envelope has a flap on one of the short sides. In addition, in printing, the flap needs to be closed, and the standard sized envelope needs to be set in the paper tray 4a with the short side having the flap as the leading edge.

In addition, the size data indicates the size of a registered sheet. The size data includes the length of the long sides and the length of the short sides.

Note that the print control information used for controlling printing of an image on an A4 sheet, the print control information used for controlling printing of an image on a B5 sheet, and the print control information used for controlling printing of an image on a standard sized envelope do not include the condition data and the position data. The use of the condition data and position data is described in more detail below.

Hereinafter, an A4 sheet and a B5 sheet, and a standard sized envelope that are registered during installation of the printer driver are collectively referred to as a "default sheet" as needed.

Sheet Registration User Interface

In the image processing apparatus 2, a user may register a sheet other than the default sheet as a registered sheet. For example, the user may register a handmade envelope as a registered sheet.

An example of a technique for registering a sheet other than the default sheet is described below. According to the present exemplary embodiment, the user uses a sheet registration user interface (hereinafter simply referred to as a "sheet registration UI"). The sheet registration UI is a user interface (a receiving unit) that receives, from the user, the name of a sheet to be registered and the print control information used for controlling printing of an image on the sheet to be registered. The sheet registration UI is displayed on the display 2e by the controller 2a that operates in accordance with the printer driver.

FIG. 3 illustrates an example of the sheet registration UI. The user inputs the name of the sheet to be registered into an input field 6a. In addition, the user inputs the size of the sheet to be registered. More specifically, the user inputs the length of the long sides of the sheet to be registered into an input field 6b and inputs the length of the short sides of the sheet to be registered into an input field 6c. In addition, the user inputs the type of the sheet to be registered. More specifically, if the sheet to be registered is an envelope, the user input a check mark into a check box 6d. However, if the sheet is not an envelope, the user does not input a check mark into the check box 6d.

In addition, if the sheet to be registered is an envelope, the user inputs the position of the flap of the envelope to be registered. More specifically, if the flap is provided on the short side of the envelope to be registered, the user inputs a check mark into a check box 6e. However, if the flap is provided on the long side of the envelope to be registered, the user inputs a check mark into a check box 6f.

Furthermore, if the sheet to be registered is an envelope, the user inputs information indicating whether the flap is open or closed when the envelope to be registered is set in the paper tray. For example, if it is desirable that an envelope to be registered be set in the paper tray with the flap open, the user inputs a check mark into a check box 6g. However, if it is desirable that an envelope to be registered be set in the paper tray with the flap closed, the user inputs a check mark into a check box 6h.

The controller 2a appends a record including the name of the sheet received through the sheet registration UI to the above-described table. Thereafter, the controller 2a additionally stores, in the above-described table, the size data indicating the size received through the sheet registration UI, the type data indicating the type of sheet received through the sheet registration UI, the position data indicating the position of the flap received through the sheet registration UI, and the condition data indicating whether the flap is open or closed received through the sheet registration UI. Note that if the sheet to be registered is a sheet other than an envelope, the condition data and the position data are not included in the print control information additionally stored in the above-described table.

In this way, the sheet other than the default sheet is registered. An example of the table after a sheet other than a default sheet has been registered is illustrated in FIG. 4. The word "open condition" in the table indicates a condition that the flap is open, and the word "closed condition" in the table indicates a condition that the flap is closed.

Hereinafter, an envelope registered by a user as a registered sheet is referred to as a "user-defined envelope".

Print Setting Interface

Among images stored in the hard disk 2c, the user selects one of the images to be printed and instructs the printer 4 to print the image to be printed using a print setting interface.

Figure 5:
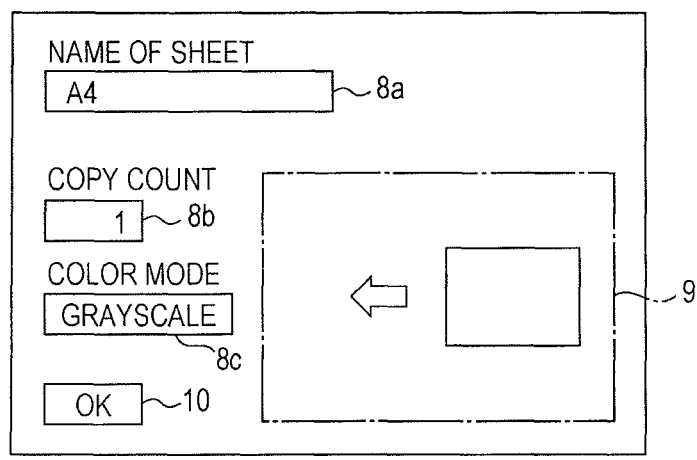
FIG. 5 illustrates an example of a print setting interface.

FIG. 5 illustrates an example of the print setting interface. The print setting interface is displayed on the display 2e. According to the present exemplary embodiment, the user performs an input operation regarding a sheet to be imaged (an operation) and inputs the name of the sheet to be imaged into an input field 8a. More specifically, the user inputs one of the names of the sheets to be registered into the input field 8a.

In addition, the user inputs a copy count into an input field 8b and inputs a color mode into an input field 8c.

After the information regarding the sheet to be imaged has been input, a guide image for explaining to the user how to set up the sheets to be printed is displayed in a guide area 9. The user refers to the guide image and sets the sheet to be imaged in the paper tray 4a. After setting the sheet to be imaged in the paper tray 4a, the user presses a button 10 in order to instruct the printer 4 to start printing.

Process

Figure 6:
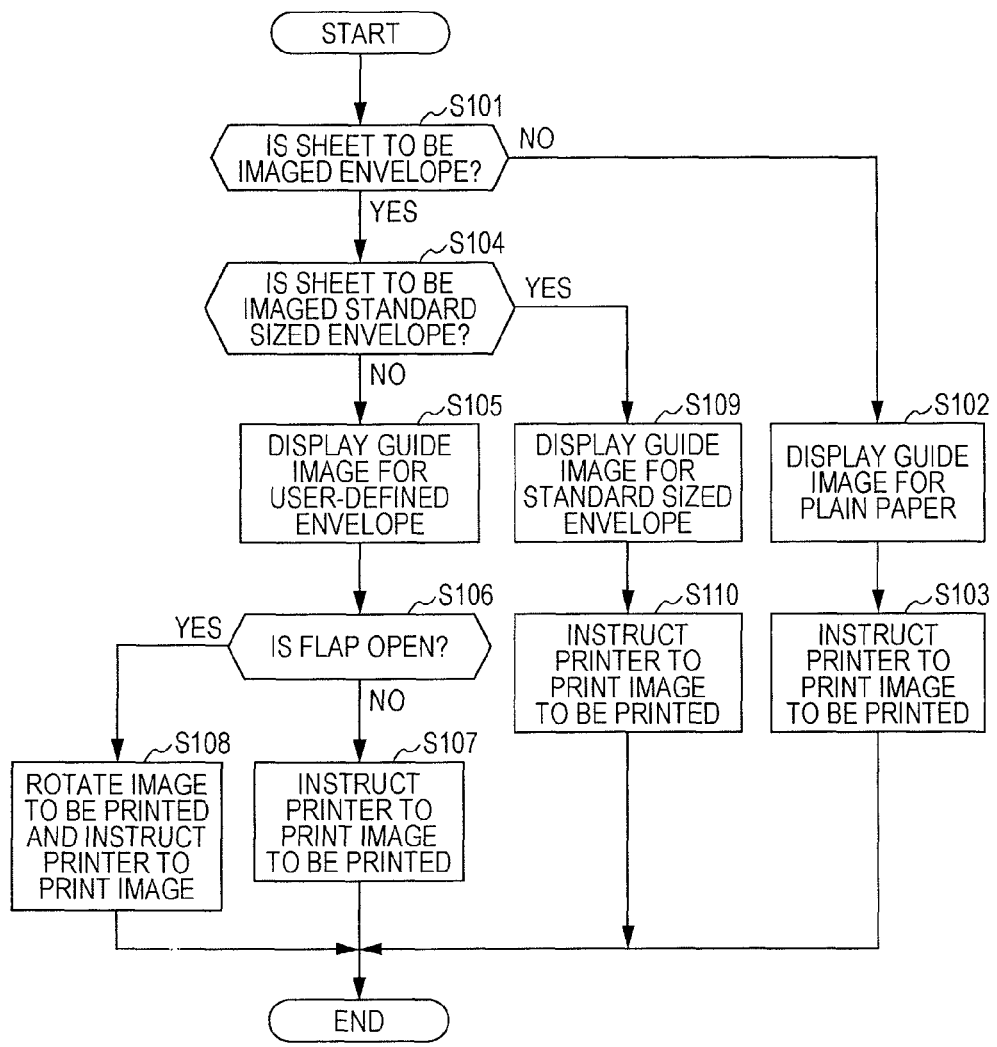
FIG. 6 is a flowchart of an exemplary process performed by an image processing apparatus.

FIG. 6 is a flowchart of an exemplary process performed by the image processing apparatus 2 when the user performs an input operation regarding a sheet to be imaged. The process is executed by the controller 2a operating in accordance with the printer driver.

The controller 2a determines whether the sheet to be imaged is an envelope (step S101). More specifically, the controller 2a reads the print control information associated with the name of a sheet input through the print setting interface (hereinafter referred to as "print control information of interest") and determines whether the type of sheet indicated by the type data included in the print control information of interest indicates an envelope.

If the sheet to be imaged is not an envelope, that is, if the sheet to be imaged is a plain paper sheet ("NO" in step S101), the controller 2a displays the above-described guide image for plain paper on the display 2e (step S102).

Subsequently, the controller 2a (a print controller) instructs the printer 4 to print an image to be printed (step S103). More specifically, when the button 10 (refer to FIG. 5) is pressed, the controller 2a generates print job data for printing the image to be printed on the basis of the print control information of interest and transmits the generated print job data to the printer 4. Note that the type data included in the print control information of interest is used to adjust heat and pressure applied to the sheet to be imaged by the fixing roller so that the heat and pressure is suitable for the quality of the sheet to be imaged. In addition, the size data included in the print control information of interest is used to control printing of the image to be printed so that the print operation is performed in accordance with the size of the sheet to be imaged.

However, if the sheet to be imaged is an envelope ("YES" in step S101), the controller 2a determines whether the sheet to be imaged is the standard sized envelope (step S104). More specifically, the controller 2a determines whether neither condition data nor position data is included in the print control information of interest. If neither condition data nor position data is included in the print control information of interest, the sheet to be imaged is a standard sized envelope. However, if both condition data and position data are included in the print control information of interest, the sheet to be imaged is not a standard sized envelope, but a user-defined envelope.

If the sheet to be imaged is a user-defined envelope ("NO" in step S104), the controller 2a (a guide unit) displays the above-described guide image for a user-defined envelope on the display 2e (step S105). At that time, the controller 2a displays the guide image on the display 2e in accordance with a combination of the flap position indicated by the position data included in the print control information of interest and the open/closed condition indicated by the condition data included in the print control information of interest.

FIGS. 7A to 7D illustrate the guide images for a user-defined envelope. These guide images are stored in the hard disk 2c. The guide images illustrated in FIGS. 7A and 7B indicate how to set up a user-defined envelope having a flap on one of the short sides. In contrast, the guide images illustrated in FIGS. 7C and 7D indicate how to set up a user-defined envelope having a flap on one of the long sides. In addition, the guide images illustrated in FIGS. 7A and 7C indicate how to set up the user-defined envelope having an open flap in the paper tray 4a. In contrast, the guide images illustrated in FIGS. 7B and 7D indicate how to set up the user-defined envelope having a closed flap in the paper tray 4a.

According to the present exemplary embodiment, when a user-defined envelope having a closed flap is set up in the paper tray 4a, the user-defined envelope needs to be set up with the short side having the flap as the leading edge. In contrast, when a user-defined envelope having an open flap is set up in the paper tray 4a, the user-defined envelope needs to be set up with the short side having no flap as the leading edge. That is, the orientations of the user-defined envelope set up in the paper tray 4a when the flap is closed and when the flap is open differ from each other by 180°.

Figure 7A:
FIG. 7A illustrates a guide image for a user-defined envelope.
Figure 7B:
FIG. 7B illustrates a guide image for a user-defined envelope.
Figure 7C:
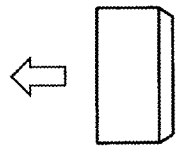
FIG. 7C illustrates a guide image for a user-defined envelope.
Figure 7D:
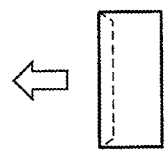
FIG. 7D illustrates a guide image for a user-defined envelope.

Accordingly, when the flap position indicated by the position data included in the print control information of interest is "short side" and if the open/closed condition indicated by the condition data included in the print control information of interest is "open condition", the controller 2a (the guide unit) displays the guide image illustrated in FIG. 7A on the display 2e. In contrast, if the open/closed condition indicated by the condition data included in the print control information of interest is "closed condition", the controller 2a displays the guide image illustrated in FIG. 7B on the display 2e. However, when the flap position indicated by the position data included in the print control information of interest is "long side" and if the open/closed condition indicated by the condition data included in the print control information of interest is "open condition", the controller 2a (the guide unit) displays the guide image illustrated in FIG. 7C on the display 2e. In contrast, if the open/closed condition indicated by the condition data included in the print control information of interest is "closed condition", the controller 2a displays the guide image illustrated in FIG. 7D on the display 2e.

In steps S106 through S108, the controller 2a (the print controller) causes the printer 4 to print the image to be printed on the basis of the print control information of interest.

More specifically, when the button 10 is pressed, the controller 2a determines whether the flap condition is "open", that is, whether the condition data included in the print control information of interest indicates an open condition (a reference condition) (step S106). If the flap condition is not "open" ("NO" in step S106), the controller 2a (the print controller), as in step S103, causes the printer 4 to print the image to be printed on the basis of the print control information of interest (step S107). As described above, the type data included in the print control information of interest is used to adjust heat and pressure applied to the sheet to be imaged by the fixing roller so that the heat and pressure are suitable for the quality of the sheet to be imaged. In addition, the size data included in the print control information of interest is used to print the image to be printed in accordance with the size of the sheet to be imaged.

As described above, the orientations of the user-defined envelope set in the paper tray 4a when the user-defined envelope has an open flap and a closed flap differ from each other. Therefore, if the flap condition is "open", that is, if the condition data included in the print control information of interest indicates an open condition ("YES" in step S106), the controller 2a (the print controller) rotates the image to be printed by 180 degrees and instructs the printer 4 to print the rotated image (step S108). More specifically, the controller 2a generates print job data used for printing the rotated image on the basis of the print control information of interest and transmits the generated print job data to the printer 4. In such a case, the size data included in the print control information of interest is used to control printing of the rotated image in accordance with the size of the sheet to be imaged.

In addition, if the sheet to be imaged is the standard sized envelope ("YES" in step S104), the controller 2a displays the guide image for the standard sized envelope on the display 2e (step S109). As described above, according to the present exemplary embodiment, it is determined that a flap is provided on one of the short sides of the standard sized envelope and, when being printed, the flap is closed and the envelope is set in the paper tray 4a with the short side having the flap as the leading edge. Therefore, the controller 2a displays the guide image illustrated in FIG. 7B on the display 2e.

Subsequently, the controller 2a instructs the printer 4 to print the image to be printed (step S110). More specifically, when the button 10 (refer to FIG. 5) is pressed, the controller 2a, as in step S103, generates print job data for printing the image to be printed on the basis of the print control information of interest and transmits the generated print job data to the printer 4. As described above, the type data included in the print control information of interest is used to adjust heat and pressure applied to the sheet to be imaged by the fixing roller so that the heat and pressure are suitable for the quality of the sheet to be imaged. In addition, the size data included in the print control information of interest is used to control printing of the image to be printed so that the print operation is performed in accordance with the size of the sheet to be imaged.

Note that embodiments of the invention are not limited to the above-described exemplary embodiments.

For example, while the above exemplary embodiments have been described with reference to the printer 4 installed outside the image processing apparatus 2, the printer 4 may be integrated into the image processing apparatus 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a receiving unit that receives print control information input by a user;
    a unit that stores, in a memory, the print control information received by the receiving unit; and
    a print controller that causes a printing unit to print an image representing an image to be printed on a sheet to be imaged on the basis of the print control information stored in the memory when a predetermined operation is performed;
    wherein the print control information includes first information indicating whether the sheet to be imaged is an envelope and second information indicating a size of the sheet to be imaged,
    wherein in response to determining that the first information included in the print control information indicates that the sheet to be imaged is an envelope, the print controller causes the printing unit to print the image which is rotated in accordance with a direction of the envelope, and
    wherein in response to determining that the first information included, in the print control information indicates that the sheet to be imaged is not an envelope, the print controller causes the printing unit to print the image to be printed.

2. The image processing apparatus according to claim 1, wherein the print control information including the first information indicating that the sheet to be imaged is an envelope further includes third information indicating an open/closed condition of a flap,
    wherein in response to determining that the first information included in the print control information indicates that the sheet to be imaged is an envelope and that the third information included in the print control information indicates a predetermined reference condition, the print controller causes the printing unit to print the image to be printed, subjected to a rotating process, and
    wherein in response to determining that the first information included in the print control information indicates that the sheet to be imaged is an envelope and that the third information included in the print control information does not indicate the predetermined reference condition, the print controller causes the printing unit to print the image to be printed.

3. The image processing apparatus according to claim 2, further comprising:
    a guide unit that displays a guide image on a display when the predetermined operation is performed, the guide unit guiding a user who performs the operation how to set up the sheet to be imaged;
    wherein the print control information including the first information indicating that the sheet to be imaged is an envelope further includes fourth information indicating a position of a flap,
    wherein the printing unit prints the image to be printed on the sheet to be imaged set on a setting member on which sheets are to be set, and
    wherein in response to determining that the first information included in the print control information indicates that the sheet to be imaged is an envelope, the guide unit displays, on the display, the guide image in accordance with a combination of the condition indicated by the third information included in the print control information and the position indicated by the fourth information included in the print control information.

4. The image processing apparatus according to claim 1, wherein the first information indicates whether the sheet to be imaged is either an envelope or a plain paper sheet.

5. The image processing apparatus according to claim 1, wherein the print control information includes third information indicating an open/closed condition of a flap.

6. The image processing apparatus according to claim 1, wherein the print control information includes fourth information indicating a position of a flap.

7. A non-transitory computer readable medium storing a program causing a computer to execute a process for processing an image, the process comprising:
    storing, in a memory, print control information received from a user; and
    causing a printing unit to print an image representing an image to be printed on a sheet to be imaged on the basis of the print control information stored in the memory when a predetermined operation is performed;
    wherein the print control information includes first information indicating whether the sheet to be imaged is an envelope and second information indicating a size of the sheet to be imaged;
    wherein the process further comprises:
        in response to determining that the first information included in the print control information indicates that the sheet to be imaged is an envelope, causing the printing unit to print the image which is rotated in accordance with a direction of the envelope, and
        in response to determining that the first information included in the print control information indicates that the sheet to be imaged is not an envelope, causing the printing unit to print the image to be printed.

8. An image processing method comprising:
    receiving print control information input by a user;
    storing, in a memory, the received print control information; and
    causing a printing unit to print an image representing an image to be printed on a sheet to be imaged on the basis of the print control information stored in the memory when a predetermined operation is performed;

wherein the print control information includes first information indicating whether the sheet to be imaged is an envelope and second information indicating a size of the sheet to be imaged, wherein the method further comprises:

in response to determining that the first information included in the print control information indicates that the sheet to be imaged is an envelope, causing the printing unit to print the image which is rotated in accordance with a direction of the envelope, and in response to determining that the first information included in the print control information indicates that the sheet to be imaged is not an envelope, causing the printing unit to print the image to be printed.

* * * * *